W. C. BANKS.
Seed-Planter.
No. 28,052.
Patented May 1, 1860.
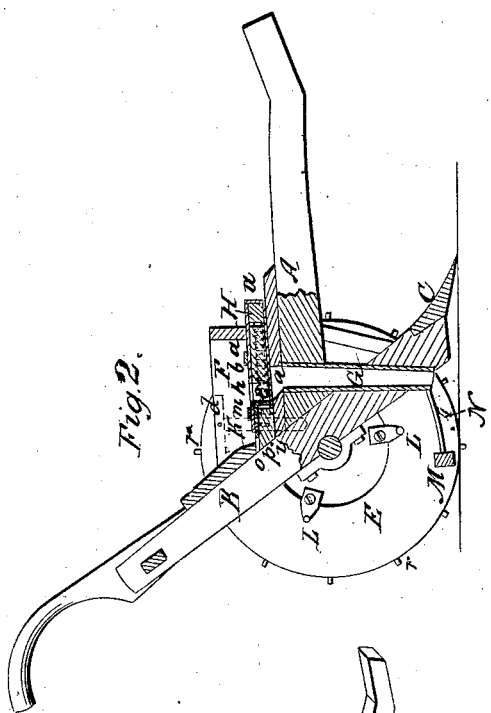
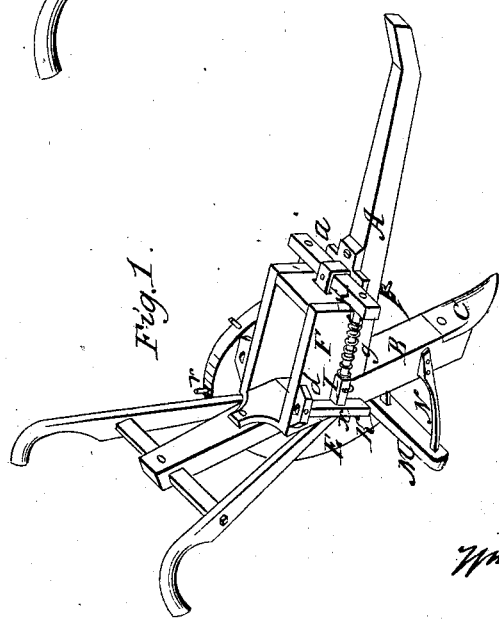
Witnesses.
E. Cohen
J. Hirsch
Inventor.
Wm C Banks mpt
UNITED STATES PATENT OFFICE.

WILLIAM C. BANKS, OF COMO DEPOT, MISSISSIPPI.

IMPROVEMENT IN CORN-PLANTERS.

Specification forming part of Letters Patent No. 28,052, dated May 1, 1860.

*To all whom it may concern:*

Be it known that I, WM. C. BANKS, of Como Depot, in the county of Panola and State of Mississippi, have invented certain new and useful Improvements in Corn-Planters; and I do hereby declare that the following is a full, clear, and exact description of the construction and operation of the same, reference being had to the accompanying drawings, in which—

Figure 1 represents a perspective view of said corn-planter. Fig. 2 represents a longitudinal vertical section through the same.

To enable others skilled in the art to make and use my invention, I will proceed to describe its construction and operation.

A represents the plow or hoe beam. B represents the stock to which a plow, C, is secured, which makes the furrow into which the corn is to be dropped.

E represents one of the driving-wheels by which the machine is supported, and by which the dropping device is operated.

F represents the seed-box, which contains the corn to be planted. *a* represents the seed-slide. It is bent in the shape represented in Fig. 2, its parallel shanks embracing the two sides of the bottom *b* of the hopper F.

*h* represents an opening in the seed slide, which, when the latter is vibrated longitudinally, alternately opens and closes the passage between the hopper and the seed-cell *c*, while the lower shank of the seed-slide, by the same operation, alternately opens and closes the seed-cell from below, so as to drop the corn at certain intervals through the seed-tube G into the furrow made by the plow C. The size or contents of the seed-cell *c* can be adjusted in the following manner for the purpose of dropping more or less corn in one hill.

*m* represents a plate, which is of the same width as the seed-cell *c*. This plate is bent at right angles, and its horizontal shank is secured to the upper side of the bottom *b* by means of a screw, *i*, which passes through a slot, *o*, while its vertical end reaches into the cell *c*, and, being of the same width as said cell, it is evident that the size of said cell is enlarged or reduced when the gage-plate *m* is moved in one or the other direction.

H represents a cross-head, which is secured to the front end of the bent seed-slide *a*, and to the ends of which are secured the rods I, which are pivoted at *x* to the levers K, the latter having their fulcra at *d*. These levers are operated at certain intervals by the cam-projections L, which are secured to the inner sides of the driving-wheels E, and which push forward the rods I and seed-slide *a*, which, on being released, are driven back suddenly by the expanding spiral springs *g*. The cam-projections L may be screwed to the driving-wheels, or they may be otherwise secured to them in such a manner as that they may easily be removed, and that their number may be increased or reduced according to the spaces in which the corn is to be planted.

The operation of the machine is as follows: As the machine is drawn over the field the driving-wheels are turned, they being prevented from slipping by the spikes *r* at their circumferences. The cams L operate the seed-slide *a* at the intervals where the corn is to be dropped. When the slide *a* is in the position represented in Fig. 2 the seed-cell *c* is in communication with the hopper F, and is filled with corn, while it is closed, below by the lower shank of the seed-slide, which prevents any corn from escaping therefrom while in this position; but when the seed-slide *a* is pushed forward by one of the cams L the upper passage from the hopper F is closed and the lower passage is opened, so that only the corn which was in the seed-cell may escape through the seed-tube G, and no more. The corn, after being dropped into the furrow, is covered by means of a coverer, M, which is secured to the elastic rods N, the latter being secured to the stock B; or, instead of this coverer, wings may be attached to the stock and extend back, so as to protect the seed-tube from the earth and prevent the earth from running into the furrow until the seeds are deposited therein; and, instead of two wheels to carry and support and operate the seeding devices, but one only may be used, and by locating the wheel or wheels in relation to the plow, as shown, the machine can be run up close to stumps or to the ends of the rows or furrows, turned short around, and be easily controlled.

The seed-slide *a*, instead of being composed of a bent piece, or of two pieces, may be a single piece or bar, with a suitable opening through it, and operated in substantially the same manner as that shown in the drawings.

Having thus fully described the nature of my invention, what I claim therein as new, and desire to secure by Letters Patent, is—

The arrangement of the gage-plate *m* for adjusting the size of the seed-cell when combined with the seed-slide *a*, or its equivalent, and when constructed and operating in connection with the other parts of the machine, substantially in the manner and for the purpose herein described.

WM. C. BANKS.

Witnesses:
E. COHEN,
I. HIRSCH.